United States Patent
Verhaeg et al.

(10) Patent No.: US 11,752,845 B2
(45) Date of Patent: Sep. 12, 2023

(54) SUNSHADE SYSTEM AND METHOD OF MANUFACTURING

(71) Applicant: Inalfa Roof Systems Group B.V.

(72) Inventors: Bernardus Jacobus Marie Verhaeg, Kessel (NL); Jose Alberto Garcia Flores, Venray (NL)

(73) Assignee: INALFA ROOF SYSTEMS GROUP B.V., Oostrum (NL)

(*) Notice: Subject to any disclaimer, the term of this patent is extended or adjusted under 35 U.S.C. 154(b) by 512 days.

(21) Appl. No.: 16/822,804

(22) Filed: Mar. 18, 2020

(65) Prior Publication Data
US 2020/0298680 A1 Sep. 24, 2020

(30) Foreign Application Priority Data

Mar. 20, 2019 (EP) .................................. 19164027

(51) Int. Cl.
*B60J 7/00* (2006.01)
*B60J 7/043* (2006.01)
(Continued)

(52) U.S. Cl.
CPC ............. *B60J 7/0015* (2013.01); *B60J 7/067* (2013.01); *B60J 1/2052* (2013.01); *B60J 7/043* (2013.01); *E06B 9/40* (2013.01); *E06B 9/58* (2013.01)

(58) Field of Classification Search
CPC . B60J 7/0015; B60J 7/067; B60J 7/043; B60J 1/2052; E06B 9/40; E06B 9/58; Y10S 1160/10
(Continued)

(56) References Cited

U.S. PATENT DOCUMENTS

| 1,370,500 A | 3/1921 | Jones |
| 1,459,155 A | 6/1923 | Ioor |

(Continued)

FOREIGN PATENT DOCUMENTS

| CN | 2700152 Y | 5/2005 |
| CN | 1721216 A | 1/2006 |

(Continued)

OTHER PUBLICATIONS

European Search Report dated Dec. 18, 2019, for corresponding European Patent Application No. 19164027.5, filed Mar. 20, 2019.
(Continued)

*Primary Examiner* — Dennis H Redder
*Assistant Examiner* — Joyce Eileen Hill
(74) *Attorney, Agent, or Firm* — Steven M. Koehler; Westman, Champlin & Koehler, P.A.

(57) ABSTRACT

A sunshade system for a vehicle, comprises a sunscreen having at least a main part and two opposed, laterally placed, inwardly folded parts. The sunscreen includes an intermediate part extending in between the main part and the inwardly folded parts each connected to the intermediate part by means of a fold. Two opposed longitudinal guides retain the adjacent inwardly folded part and at least a part of the corresponding intermediate part of the flexible sunscreen. The guides engage the inwardly folded part. Each intermediate part includes a first compressed part extending in longitudinal direction and comprising at least material of the main part. The first compressed part is established under the influence of a compression treatment such that said material in the first compressed part has a thickness smaller than the thickness of the same material in the main part.

16 Claims, 7 Drawing Sheets

US 11,752,845 B2
Page 2

(51) Int. Cl.
*B60J 7/06* (2006.01)
*B60J 1/20* (2006.01)
*E06B 9/40* (2006.01)
*E06B 9/58* (2006.01)

(58) Field of Classification Search
USPC .................................. 106/370.22; 296/214
See application file for complete search history.

(56) References Cited

U.S. PATENT DOCUMENTS

| | | | |
|---|---|---|---|
| 1,673,326 | A | 6/1928 | Goldsmith |
| 3,017,927 | A | 1/1962 | Demko |
| 4,649,981 | A | 3/1987 | Bibeau |
| 4,825,921 | A | 5/1989 | Rigter |
| 5,117,892 | A | 6/1992 | Murray |
| 5,934,353 | A | 8/1999 | Buhr |
| 6,179,373 | B1 | 1/2001 | Bohm et al. |
| 6,394,173 | B2 | 5/2002 | Enssle |
| 6,942,003 | B2 | 9/2005 | Thompson |
| 7,114,766 | B2 | 10/2006 | Becher et al. |
| 7,114,767 | B2 | 10/2006 | Grimm et al. |
| 7,793,702 | B2 | 9/2010 | Biewer et al. |
| 7,971,626 | B2 | 7/2011 | Renz |
| 8,474,510 | B2 | 7/2013 | Nellen et al. |
| 8,955,575 | B2 | 2/2015 | Glasl et al. |
| 9,090,147 | B2 | 7/2015 | Nellen et al. |
| 9,108,491 | B2 | 8/2015 | Zendath |
| 9,840,134 | B2 | 12/2017 | Van Boxtel |
| 2005/0225122 | A1 | 10/2005 | Becher et al. |
| 2005/0225123 | A1 | 10/2005 | Grimm et al. |
| 2006/0027347 | A1 | 2/2006 | Boehm et al. |
| 2007/0175603 | A1 | 8/2007 | Lin |
| 2008/0179021 | A1 | 7/2008 | Biewer et al. |
| 2009/0145559 | A1 | 6/2009 | Glasl et al. |
| 2009/0178771 | A1 | 7/2009 | Lin |
| 2011/0146921 | A1 | 6/2011 | Nellen et al. |
| 2011/0226426 | A1 | 9/2011 | Zendath |
| 2011/0227371 | A1 | 9/2011 | Nellen et al. |
| 2014/0333097 | A1* | 11/2014 | Kring .................. B60R 13/0275 296/214 |
| 2016/0257184 | A1* | 9/2016 | Van Boxtel .............. B60J 10/35 |
| 2017/0297419 | A1* | 10/2017 | Ten-Jet-Foei .......... B60J 1/2061 |

FOREIGN PATENT DOCUMENTS

| | | |
|---|---|---|
| DE | 10225360 C1 | 10/2003 |
| DE | 102004028882 A1 | 1/2006 |
| DE | 202006015107 U1 | 1/2007 |
| DE | 102006023813 A1 | 11/2007 |
| DE | 202011000725 U1 | 7/2012 |
| EP | 1588880 A2 | 10/2005 |
| EP | 1616737 A1 | 1/2006 |
| EP | 1953018 A1 | 8/2008 |
| EP | 3064386 A1 | 9/2016 |
| FR | 1378077 A | 11/1964 |
| FR | 1379077 A | 11/1964 |
| WO | 2006053520 A2 | 5/2006 |
| WO | 2009026904 A1 | 3/2009 |
| WO | 2010022769 A1 | 3/2010 |
| WO | 2010063312 A1 | 6/2010 |

OTHER PUBLICATIONS

European Search Report and Written Opinion for European Patent Application No. 19164027.5, dated Mar. 27, 2020.

* cited by examiner

SUNSHADE SYSTEM AND METHOD OF MANUFACTURING

BACKGROUND

The discussion below is merely provided for general background information and is not intended to be used as an aid in determining the scope of the claimed subject matter.

Aspects of the invention relate to a sunshade system for use in a vehicle roof assembly.

Such sunshade system is known in the art. In case such sunshade system is equipped with a flexible sunscreen having a relative large thickness and a relative large weight such as for instance a microfiber cloth, the slidable guidance of the flexible sunscreen in the longitudinal guides may be jeopardized by the friction the cloth endures in the guide channels. For instance it may happen that the friction is so high that the cloth gets stuck inside the guide channels. This may happen because of the thickness of the cloth material or due to the chemical reactions between substances that are used for treatment of the cloth with the surface of the longitudinal guides whereby the chemical reaction influences the friction between the flexible sunscreen and the guides.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A sunshade system for use in a vehicle roof assembly, comprises a flexible sunscreen having at least a main part and two opposed, laterally placed, inwardly folded parts, a leading edge and a trailing edge. The flexible sunscreen further comprises an intermediate part extending in between the main part and the inwardly folded parts and extending in longitudinal direction, whereby each inwardly folded part is connected to the intermediate part by means of a fold. Two opposed longitudinal guides are capable of retaining therein in a transverse direction and slidably guiding therein in a longitudinal direction, the adjacent inwardly folded part and at least a part of the corresponding intermediate part of the flexible sunscreen. The guides are provided with locking members and with guide chambers for engaging the inwardly folded part of the flexible sunscreen for preventing said inwardly folded parts from moving out of the longitudinal guides when the flexible sunscreen is at least partly unwound.

Each intermediate part includes a first compressed part extending in longitudinal direction and comprising at least material of the main part. The first compressed part is established under the influence of a compression treatment such that said material in the first compressed part has a thickness smaller than the thickness of the same material in the main part.

This compression treatment of the intermediate part is advantageous and can be used for several purposes. First, the compression treatment can be used to improve the sliding properties of the surface of the material of the main part that is present in the first compressed part of the intermediate part. This is useful in situations where said material in the intermediate part is in contact with the longitudinal guides. Especially if the material of the main part of the flexible sunscreen is a microfiber material, for example made of polyester and polyurethane or the like, the compression treatment will lower the coefficient of friction at the surface thereof. It can also neutralize the chemical substances with which the sunscreen is treated (for example a flame retardant) such that no chemical reactions will occur between the material of the sunscreen and the surface of the longitudinal guides. The compression treatment can also be used for attaching the material of the main part of the flexible sunscreen to a separate piece of material in the first compressed part. In an embodiment in which part of the intermediate parts and the inwardly folded parts are made from the separate piece of material, the compression treatment can be used to attach a first layer of the material of the main part of the flexible sunscreen to an overlapping second layer of the separate piece of material, either without or with additional means such as glue or stitching. This latter will depend on the materials used for making the main part and the separate piece of material.

As such, according to a first aspect of the invention the intermediate parts, the inwardly folded parts and the folds are formed by a lateral edge of the main part. In this embodiment the lateral edge of the main part of the flexible sunscreen is formed such that the first compressed part and the inwardly folded parts and the fold is made out of one part. This enables the manufacturing of a cheap and effective improved side guidance of the flexible sunscreen.

According to another embodiment, the folded parts, the folds and a part of the intermediate part are formed as a strip shaped part separate from the main part (hereinafter "separate strip shaped part"). In this embodiment the separate strip shaped part is used to be mainly in engagement with the guide surface. In this way the material type of the separate strip shaped part can be chosen such that it can be matched to the guide channels for instance in relation to the coefficient of friction. A low coefficient of friction of the second layer may reduce the sliding forces of the flexible sunscreen.

In another aspect of this last embodiment the first compressed part includes a first layer formed by the material of the main part of the sunscreen and a second layer formed by a portion of the separate strip shaped part. The first layer and the second layer are positioned in overlap with each other and wherein at least a substantial part of the first and second layers are compressed under the influence of a compression treatment whereby the compression treatment comprises at least one of a pressure and temperature treatment so as to form the first compressed part in which the second layer is fixedly connected to the first layer. Such treatment subjected to the overlapping first and second layers that form the first compressed part after the treatment, has the effect that the first compressed part is not only reduced in thickness in respect to the first layer thickness providing a lower coefficient of friction with regard to the guide surfaces, but that the first compressed part also forms the connection between the overlapping parts of the main part and of the separated strip shaped part. This connection could be caused by melting or welding of the layers to each other.

In another aspect of the last mentioned embodiment the second layer is made of a material with a low coefficient of friction. In this case the material is selected to be able to reach the lowest possible coefficient of friction in combination with the guide surfaces. The separate strip shaped part is in a slidable engagement with the longitudinal guide and as such the separate strip shaped part may cause less friction in the guide when the flexible sunscreen is wound up or unwound from the winding shaft compared to the situation that the material of the main part of the sunscreen is in slidable engagement with the guides. This is because the main part may be made of a microfiber cloth or another suitable material and may have a higher coefficient of friction despite the compression treatment that the first layer thereof has undergone.

In another aspect of the invention the first compressed part has a thickness in the range of 0.3 mm to 1.75 mm and in particular in the range of 0.4 mm to 1 mm. This includes the thicknesses in case the first compressed part comprises only the first layer or in case the first compressed part comprises first and second layers. Each of the first and second layers may have a variety of thicknesses before the compression treatment is done, due to different materials that may be used. Also the thickness after the compression treatment may be depending on the type of materials used of the first and second layer. It may be necessary to form a very small thickness of the compression part in order to get a good adhesion between the first and second layer depending on the type of materials used for the first and second layer.

In another aspect of the invention the lateral width W1 of the first compressed part lies in the range of 4 to 30 mm and in particular a width in the range of 6 to 20 mm. The lateral width W1 depends on whether the first compressed part comprises only the material of the main part or that the first compressed part comprises the first and second layer of the main part and the separate strip shaped part. In case the first compressed part only comprises the material of the main part, no connection between first and second layer needs to be established. So in this case the width W1 of the first compressed part only depends on the geometry of the longitudinal guide in lateral direction. The first compressed part should have such width that the guide surfaces are only in contact with the first compressed part. In that case, the first compressed part could extend the whole intermediate part.

In case the first compressed part comprises a first and second layer the width W1 depends not only on the geometry of the guide in lateral direction but also on the strength of the connection between the first and second layer. This strength may be required because of the lateral force applied to the flexible sunscreen necessary to keep the flexible sunscreen taut between opposite longitudinal guides. It may be necessary to keep a maximum width of the range because of high lateral forces applied to the sunscreen.

According to yet another embodiment the first compressed part further comprises an additional fixing between the first and second layer. Such another fixing may be stitching or gluing or an additional treatment by ultrasonic welding. An additional fixing may be required in such cases where the lateral forces in the flexible sunscreen are high and the width of the first compressed part may not be sufficient due to the boundaries given by the lateral section of the guide. The additional fixing may extend in or between the first and second layer in the first compressed part area in longitudinal direction.

According to yet another embodiment the intermediate part comprises a second compressed part adjacent to the first compressed part wherein the thickness of the second compressed part is smaller than the thickness of the first compressed part. Usually the inwardly folded part is unfolded when the flexible sunscreen is wound up on to the winding shaft. This unfolding occurs in the area between the end of the longitudinal guide and the winding shaft. At the moment the inwardly folded part is pulled out of the guide channel it unfolds in a lateral outward direction to be rolled up unfolded onto the winding shaft. This unfolding operation of the inwardly folded part takes space between the end of the guide and the winding shaft. To reduce such space it would be better to keep the inwardly folded part in a folded condition when wound up onto the winding shaft. However the thickness of this inwardly folded part in a folded condition wound up onto the winding shaft may be thicker than the rest of the flexible screen. This causes wrinkles when winding the flexible sunscreen onto the winding shaft. So to enable the inwardly folded part to be wound up onto the winding shaft in a folded condition without wrinkles, a second compressed part is proposed adjacent to the first compressed part. The second compressed part is capable of receiving the inwardly folded part when it is folded towards the second compressed part in such a way that the total thickness of the second compressed part and the inwardly folded part is substantially equal to the first compressed part. This may result in winding the flexible sunscreen up onto the winding shaft in a wrinkle free manner.

According another aspect of the invention a method for forming the first and optionally also the second compressed part comprises the steps of:
  applying at least the lateral side area of the flexible sunscreen in between an upper and a lower part of a compression tool,
  clamping the upper and lower parts of the compression tool together whereby the clamping tool produces a clamping force,
    and wherein the upper and lower parts of the compression tool produce a temperature on respective clamping surfaces in the range of 150° C. to 200° C. and in particular in the range of 160° C. and 190° C.,
    and wherein the duration of the clamping of the upper and the lower part of the compression tool and heating the tool halves extends for a period of time in the range of 0.5 to 20 seconds and in particular in a range of 5 to 15 seconds,
    and wherein the duration of the clamping of the upper and the lower part of the compression tool and cooling down the tool halves extends for a period of time in the range of 0.5 to 40 seconds and in particular in a range of 5 to 30 seconds.

Such process enables to establish the first and optionally also a second compressed part both in the embodiment of only the material of the main part between the compression tool halves, and in the embodiment having a first and a second layer of the main part and separate strip shaped part, respectively, between the tool halves. The process foresees in a heating up period of the tool halves after which the tool halves are cooled down while the tool halves are still clamped together with the clamping force with which the clamping process started. This cooling down can be done by just turning of the heating device in the tool halves and cooling down gradually in a natural way, or it can be done that the cooling down is forced by additional cooling with air or cooling fluids that cool down the tool halves in a quicker way.

This compression treatment can have a beneficial effect on various materials, for example a microfiber material made of polyester and polyurethane as sunscreen material. It is also effective if this material as the first layer is combined with a second layer consisting for example of a woven layer and a warp knitted layer of PES (Polyether Sulfones) with or without a glue between the first and second layer. Also other sunscreen blackout materials known in the art either or not combined with separate strip shaped parts of known materials having better sliding properties can be used for treatment with the above process.

An aspect of the invention also includes the sunscreen for use in the sunshade system as described above.

BRIEF DESCRIPTION OF THE DRAWINGS

Hereinafter aspects of the invention will be elucidated while referring to the drawings:

FIGS. 3-5b show sectional views according line A-A in FIG. 2 with different embodiments.

DETAILED DESCRIPTION OF THE ILLUSTRATIVE EMBODIMENTS

Figure 1:
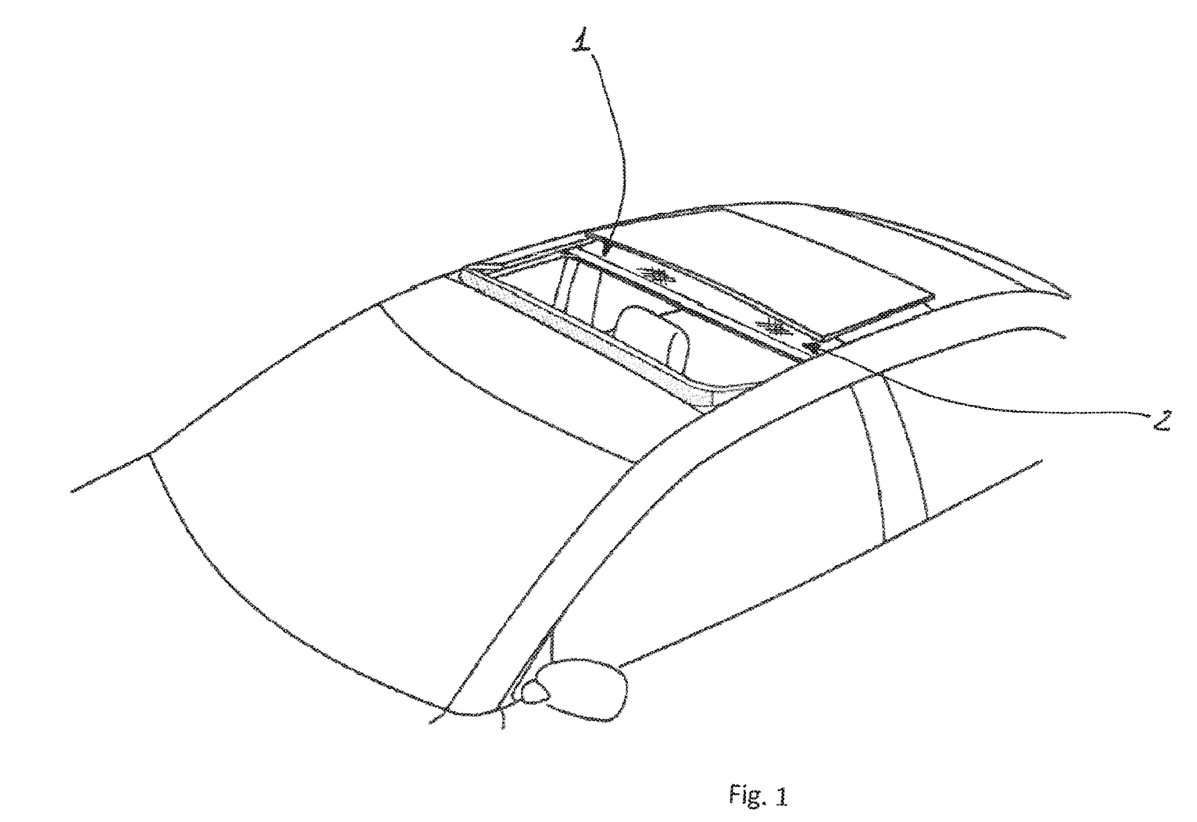
FIG. 1 shows an isometric view of an open roof construction in vehicle.

FIG. 1 shows part of a vehicle having an open roof assembly and a sunshade system 1. The open roof assembly comprises at least one openable semi-transparent panel which is capable to be at least partly opening an opening of the roof assembly and is capable of closing the opening. The open roof assembly may further comprise a second semi-transparent panel placed behind the openable panel seen in a longitudinal direction of the vehicle. The second panel may be an openable panel or may be a fixed panel. The sunshade system 1 is placed below the open roof assembly in the vehicle roof. The sunshade system 1 is capable of closing and at least partly opening an opening below the open roof assembly.

Figure 2:
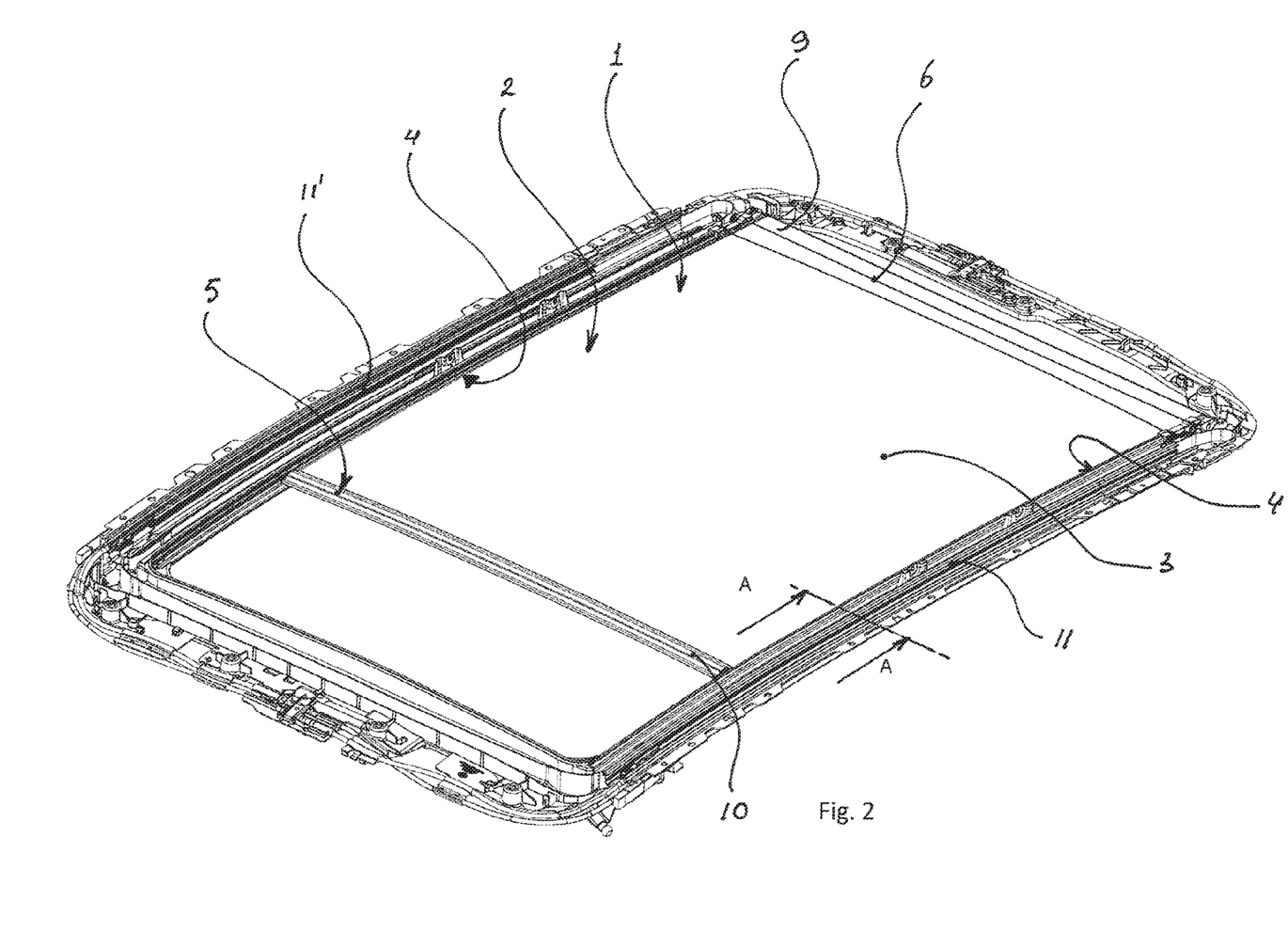
FIG. 2 shows an isometric view of part of the open roof construction showing a part of the sunshade system.

FIG. 2 shows the sunshade system 1 built into the frame of the open roof assembly. The sunshade system 1 comprises a winding shaft 9 for winding and unwinding a flexible sunscreen 2. The winding shaft 9 is placed near a rear end of the frame and is rotatably connected with the frame. The frame comprises a rear beam at its rear end connecting the rear part of the opposite longitudinal guides 11, 11'. The flexible sunscreen 2 is fixed with its rear end to the winding shaft 9 and with its opposite front end to an operating beam 10. The lateral edges of the flexible sunscreen 2 are slidably engaged with the longitudinal guides 11, 11' forming part of the frame at the lateral sides of the frame. The operating beam 10 is also slidably engaged by means of slide shoes (not shown) with the longitudinal guides 11, 11'. The frame at its front end comprises a front beam connecting the opposite longitudinal guides 11, 11' at the front part of the frame. The material of the sunscreen 2 may for example be a microfiber material composed of about 68% polyester and 32% polyurethane (e.g. Alcantara).

As can be seen in the sectional views of FIGS. 3-5b each of the longitudinal guides 11, 11' comprises a guide chamber 13, whereby the guide chamber 13 comprises a bottom surface 19 and a flange or locking member 12. The flexible sunscreen 2 comprises a main part 3 which is visible from the inside of the vehicle by the occupants, an intermediate part 7 formed at each lateral side of the flexible screen, and wherein the intermediate part 7 further comprises a first compressed part 14. The inwardly folded part 4 connects to the intermediate part 7 by means of a fold 8. This fold 8 may act as a hinge in case the inwardly folded part 4 is folded back in line with the main part 3 before it is wound up on the winding shaft 9. The inwardly folded part 4 hooks behind the locking member 12 of the guide 11, 11' and part of the intermediate part 7 is supported by the bottom surface 19 of the guide chamber 13. This construction enables the flexible sunscreen 2 to be kept taut in between the opposite guides 11, 11', without the lateral ends of the flexible sunscreen 2 being able to leave the guide chamber 13 in a perpendicular direction.

Figure 3:
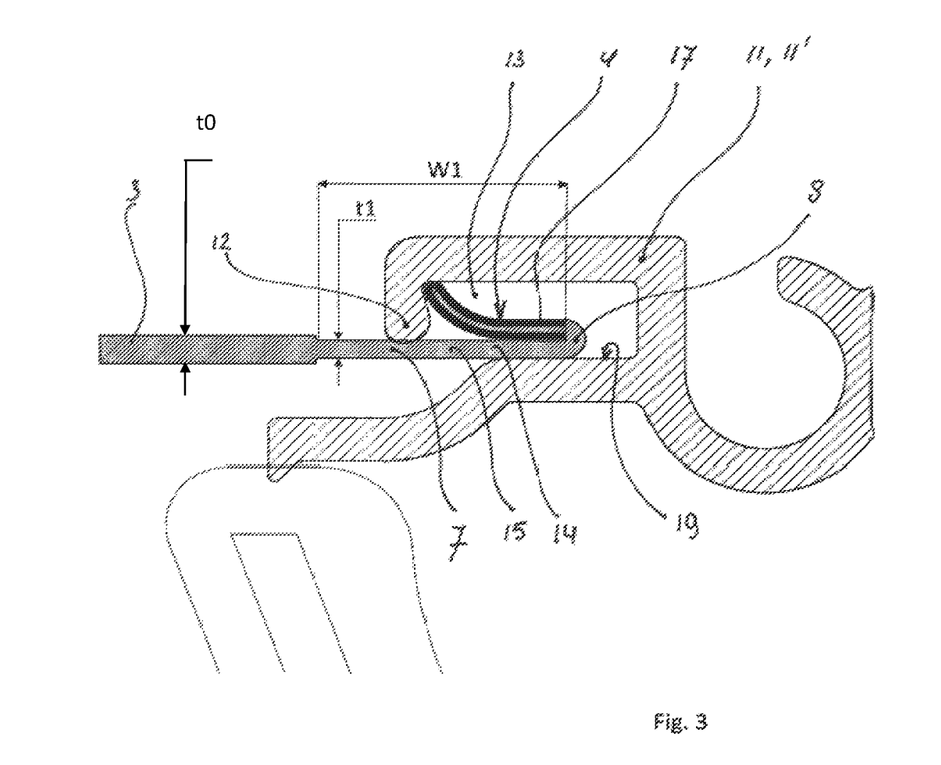

The intermediate part 7 comprises a first compressed part 14 which is a part that is treated with a compression treatment. In this case, the first compressed part 14 occupies substantially the complete intermediate part 7, so that the width W1 of the compressed part 14 is substantially equal to the width of the intermediate part 7. After the compression treatment a thickness t1 of the first compressed part 14 is smaller than a thickness t0 of at least an adjacent portion of the main part 3 of the flexible sunscreen 2. The thickness t1 is chosen such that the first compressed part 14 is able to slide with its upper side along the lower tip of the locking member 12 and with its lower side along the bottom surface 19 of the guide chamber 13. In this manner, the inwardly folded part 4 and part of the intermediate part 7 are locked in the guide chamber 13 and are not able to exit the guide chamber 13 in lateral direction. In case of an Alcantara sunscreen 2, the thickness t0 of the main part can for example be generally 1 mm+/−0.15 mm. In such case, the thickness t1 of the first compressed part 14 may for example be around 0.4 mm.

The inwardly folded part 4 is equipped with a liner 17 of PES material (Polyether Sulfones) or a suitable material of the same group of materials, the liner 17 is pressed into the inwardly folded part 4. The operation can be done in the same operation step of the compression treatment, however it can be done also in sequence, whereby first the first compressed part 14 is formed and after that the liner 17 is formed onto the inwardly folded part 4. Also it is conceivable that the sequence of operation is done the other way around whereby first the liner 17 is formed onto the inwardly folded part 4 after which the first compressed part 14 is formed.

Furthermore, in FIG. 3 a part of a headliner is shown which is in engagement with a lower part of the guide 11, 11'. It is undesirable that the occupants in the vehicle would see the intermediate part 7 or the first compressed part 14 of the flexible sunscreen 2 because of the surfaces that may have a different surface quality after the compression treatment compared to the adjacent main part 3 of the flexible sunscreen 2. The headliner hides the guide 11, 11' for the occupants view in the vehicle. The intermediate part 7 and the first compressed part 14 lie, when looked in a direction of the view of the occupant, behind the protruding part of the guide 11, 11' and behind the upper part of the headliner and thus may be hidden for the occupants eye.

Figure 4A:
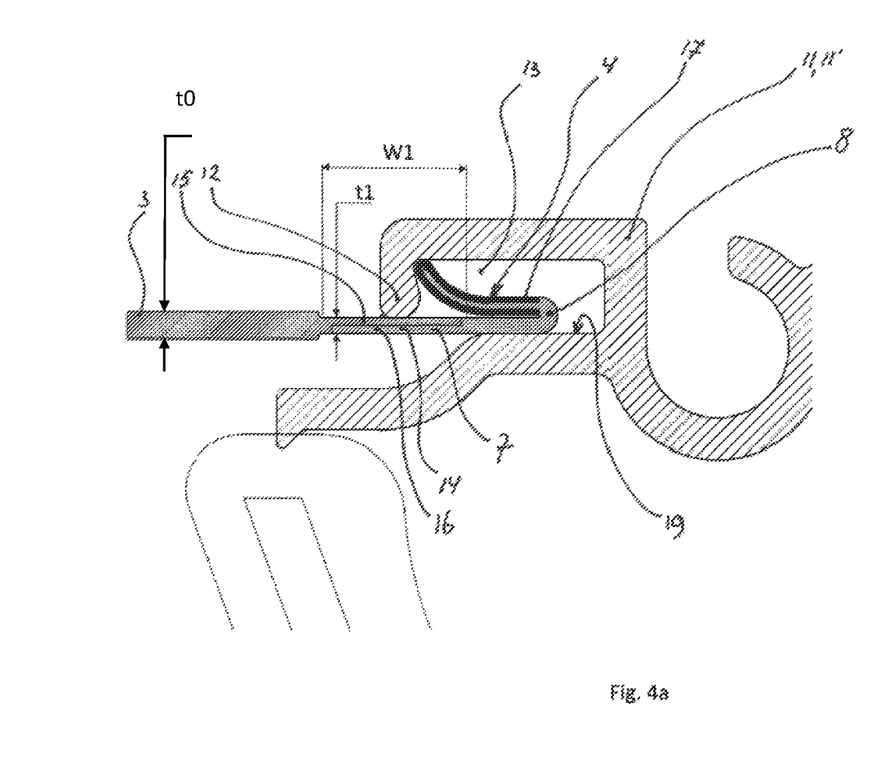

In FIG. 4a another embodiment is shown wherein a part of the intermediate part 7 and the inwardly folded part 4 are formed as a strip shaped part separate from and of a different material to the main part 3 of the flexible sunscreen 2. The part of the intermediate part 7 and the inwardly folded part 4 hereinafter referred to as "separate strip shaped part".

Within the intermediate part 7, the separate strip shaped part overlaps with the material of the main part 3, where a second layer 16 of the material of the separate strip shaped part overlaps a first layer 15. The compressed part 14 is in this case smaller than the intermediate part and is slightly larger than the overlapping first and second layers 15, 16.

In FIG. 4a the first layer 15 is above the second layer 16 so that the contact with the lower tip of the locking member 12 is established by the first layer 15, while the larger contact area between the bottom surface 19 of the longitudinal guides 11, 11' and the intermediate part 7 is established by the separate strip shaped part. The first layer 15 and the second layer 16 are positioned in overlap with each other and the first and second layer 15, 16 are compressed under the influence of a compression treatment whereby the compression treatment comprises at least one of a pressure and temperature treatment so as to fixedly connect the second layer 16 to the first layer 15. Of course, the materials of the first and second layers 15, 16 should be chosen to form a bond between them under influence of the compression treatment. The first compressed part 14 may have a thickness t1 in the range of 0.3 mm to 1.75 mm and in particular in the range of 0.4 to 1 mm. The thickness t1 of the first compressed part 14 may be substantially equal to or smaller than a thickness t0 of at least an adjacent portion of the main part 3 of the flexible sunscreen 2. The thickness of the first layer 15 alone will of course be smaller than that of the main part 3 due to the compression treatment. In general, the material of the main part 3 will be compressed more than the material of the separate strip shaped part, but this is not necessary. As an example: if the main part 3 of the sunscreen 2 is made of Alcantara (as mentioned before) and the separate strip shaped part is made of Reptile fabric having a general thickness of 0.75 mm+/−0.2 mm, the thickness of layers 15, 16 is 1.75 mm before compression, and after compression it may have a thickness t1 of around 0.63 mm, so smaller than the thickness t0 of the main part 3.

The lateral width W1 of the first compressed part 14 may lie in the range of 4 mm to 30 mm and in particular a width in the range of 6 mm to 20 mm. This width W1 will generally be smaller than in the embodiment of FIG. 3, where substantially the whole intermediate part 7 is compressed. The separate strip shaped part may be made of a woven layer and a warp knitted layer of PES material (Polyether sulfones) or another suitable material of the same group of materials. However it is also conceivable that the separate strip shaped part is made of another material with a low coefficient of friction.

Figure 4B:
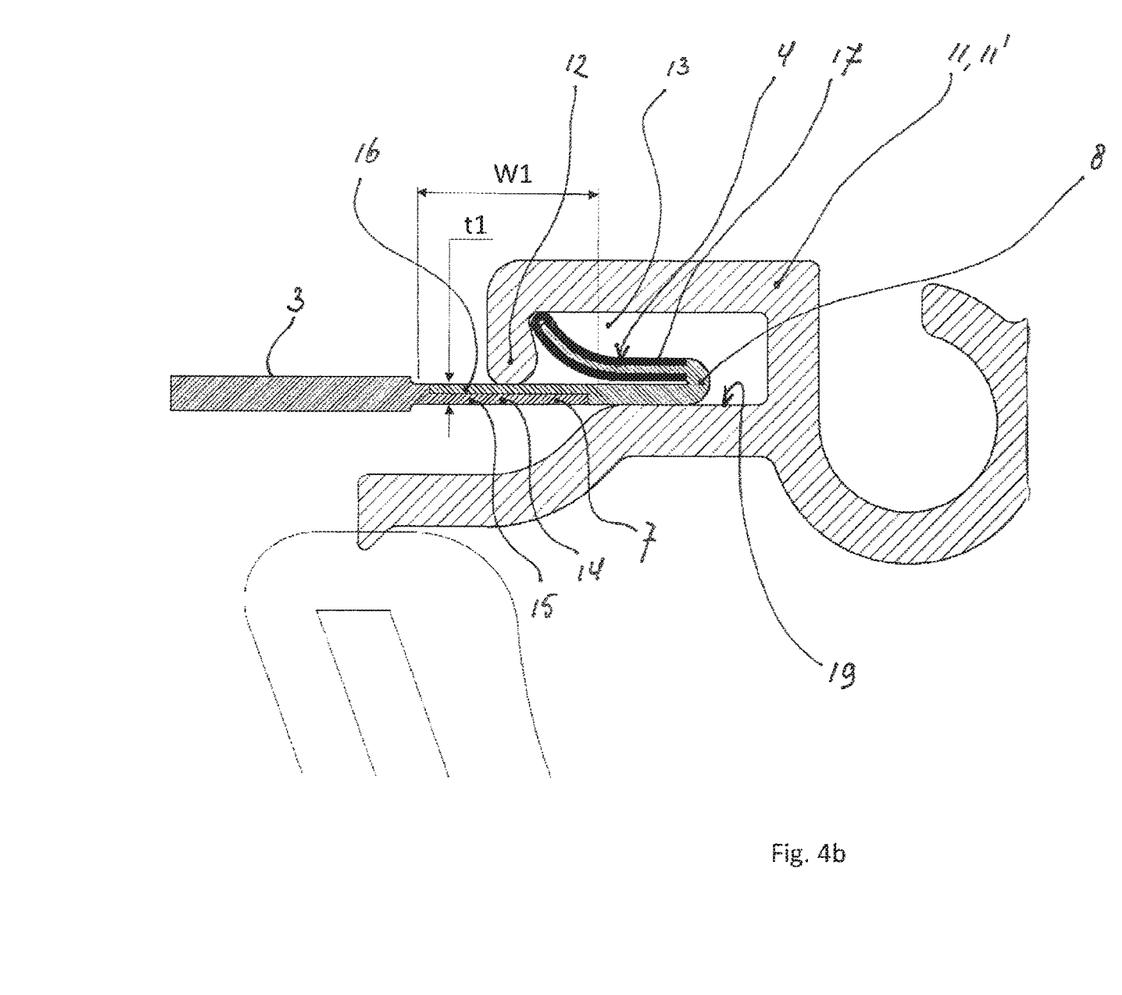

In FIG. 4b the second layer 16 is above the first layer 15 such that the only contact surface area between the intermediate part 7 and the longitudinal guides 11, 11' is established by the separate strip shaped part. The latter embodiment of FIG. 4b has the advantage that all of the material of the separate strip shaped part is in slidable engagement with the surface of the longitudinal guides 11, 11' such that an optimal sliding engagement is formed with a low coefficient of friction between the separate strip shaped part and the guide, which may result in a low force operation of winding and unwinding of the sunshade system 1.

Figure 5A:
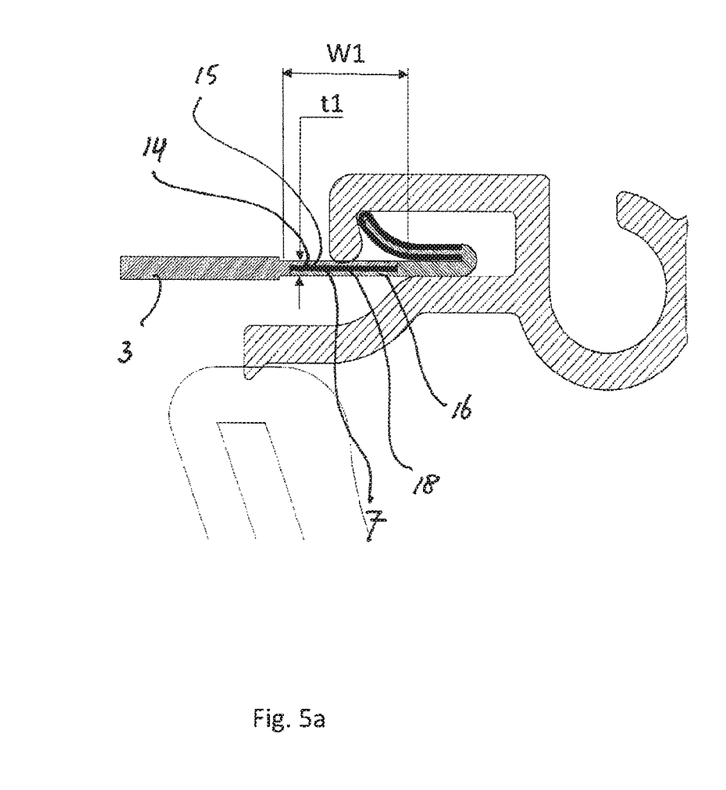
Figure 5B:
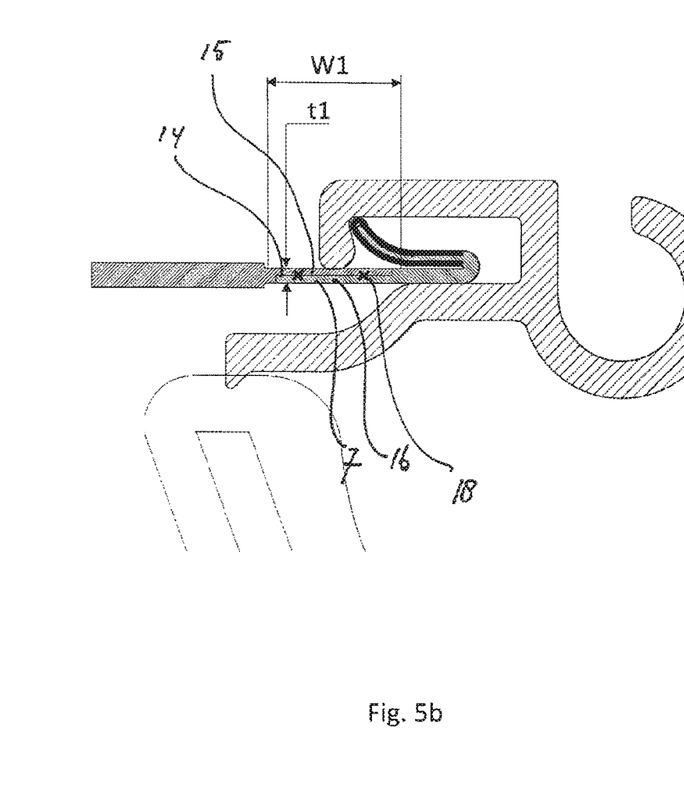

In FIGS. 5a and 5b an embodiment is shown in which an additional way of fixing is shown whereby in FIG. 5a the additional fixing 18 is effected by a layer of glue placed between the first and second layer 15, 16 to ensure the connection between the first and second layer 15, 16. In FIG. 5b an additional fixing 18 is shown which is a sequence of stitches along the full longitudinal length of the separate strip shaped part. It is conceivable that more sequences of stitches are provided, for instances adjacent and parallel to each other, to create a solid connection between the first and second layer 15, 16.

Figure 6:
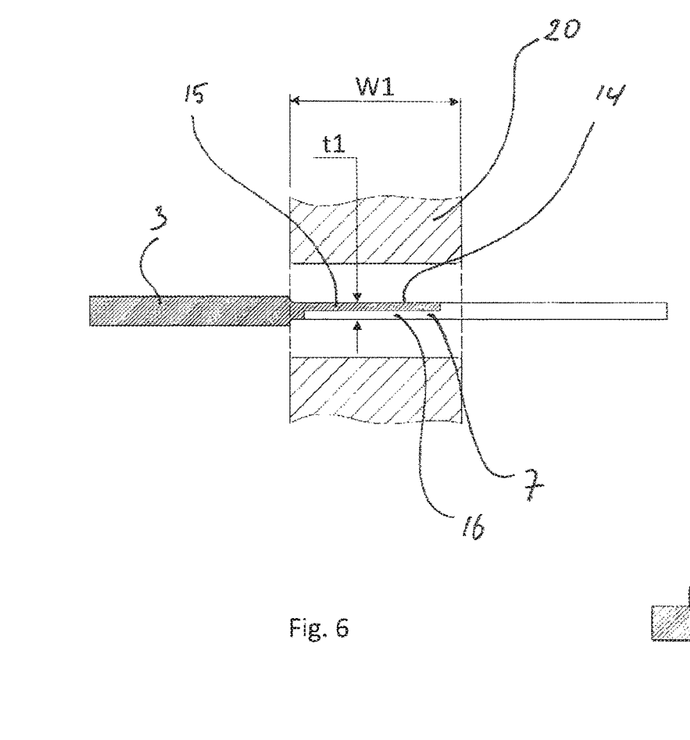
FIGS. 6 and 7 show a schematic view with the lateral part of the flexible sunscreen and two tool halves of the compression tool.

In FIG. 6 a compression tool 20 with two tool halves is shown. The tool 20 has a width W1 which lies in a range as described above to form the first compressed part 14. From the drawing it becomes clear that the tool width W1 is slightly wider than the width of the overlap between the first and second layers 15, 16 to allow for tolerances in the overlap between the first and second layers 15, 16.

Figure 7:
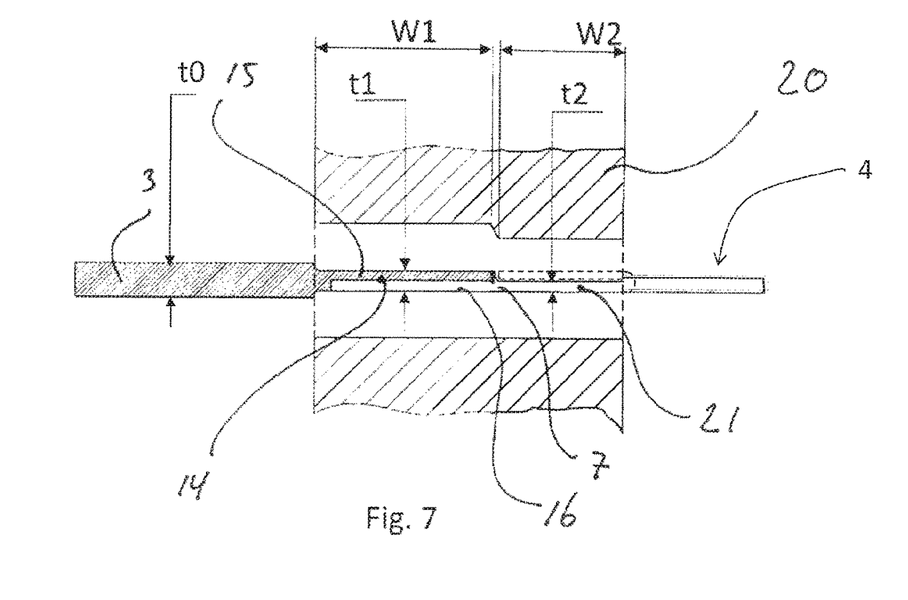

In FIG. 7 another embodiment is shown, whereby the compression tool 20 is equipped with a second stage that enables the formation of a second compressed part 21 adjacent to and outwardly of the first compressed part 14, and whereby the thickness t2 of the second compressed part 21 is such that when the inwardly folded part 4 is folded completely against the second compressed part 21 the total thickness of the stack is substantially the same as the thickness t1 of the first compression part 14 including the first and second layers 15, 16. Thus, the first and second compressed parts 14, 21 will generally extend along at least the whole intermediate part 7.

The invention is not limited to the embodiments described before which may be varied widely within the scope of the invention as defined by the appending claims.

What is claimed is:

1. A sunshade system for use in a vehicle roof assembly, comprising:
    a flexible sunscreen configured to open or at least partly close an opening below the vehicle roof assembly, having at least a main part and two opposed, laterally placed, inwardly folded parts, a leading edge and a trailing edge,
    the flexible sunscreen further comprising an intermediate part extending in between the main part and the inwardly folded parts and extending in a longitudinal direction, whereby each inwardly folded part is connected to the intermediate part by a fold,
    a winding shaft configured for winding and unwinding the flexible sunscreen at its trailing edge,
    an operating beam attached to the leading edge of the flexible sunscreen, and
    two opposed longitudinal guides configured to retain therein in a transverse direction and slidably guiding therein in a longitudinal direction, the adjacent inwardly folded part and at least a part of the corresponding intermediate part of the flexible sunscreen, said guides being provided with locking members and with guide chambers configured to engage the inwardly folded parts of the flexible sunscreen to prevent said inwardly folded parts from moving out of the longitudinal guides when the flexible sunscreen is at least partly unwound,
    wherein each intermediate part includes a first compressed part extending in a longitudinal direction and comprising at least material of the main part, the first compressed part that has undergone compression treatment such that a thickness of the first compressed part of each intermediate part is generally smaller than a thickness of an adjacent portion of the main part, wherein each folded part, the corresponding fold and a part of the corresponding intermediate part are formed as a strip shaped part separate from the main part, and wherein the first compressed part includes a first layer formed by the material of the main part of the sunscreen and a second layer formed by a portion of the strip shaped part.

2. The sunshade system according to claim 1, wherein the first layer and the second layer overlap each other and wherein at least a substantial part of the first and second layers are compressed from a compression treatment whereby the compression treatment comprises at least one of a pressure and temperature treatment so as to form the first compressed part in which the second layer is fixedly connected to the first layer.

3. The sunshade system according to claim 2, wherein the second layer is made of a material with a low coefficient of friction.

4. The sunshade system according to claim 1, wherein the first compressed part has a thickness in a range of 0.3 to 1.75 mm.

5. The sunshade system according to claim 1, wherein a lateral width of the first compressed part lies in a range of 4 to 30 mm.

6. The sunshade system according to claim 2, wherein the first compressed part further comprises an additional fixing between the first and second layer.

7. A sunshade system for use in a vehicle roof assembly, comprising:
   a flexible sunscreen configured to open or at least partly close an opening below the vehicle roof assembly, having at least a main part and two opposed, laterally placed, inwardly folded parts, a leading edge and a trailing edge,
   the flexible sunscreen further comprising an intermediate part extending in between the main part and the inwardly folded parts and extending in a longitudinal direction, whereby each inwardly folded part is connected to the intermediate part by a fold,
   a winding shaft configured for winding and unwinding the flexible sunscreen at its trailing edge,
   an operating beam attached to the leading edge of the flexible sunscreen, and
   two opposed longitudinal guides configured to retain therein in a transverse direction and slidably guiding therein in a longitudinal direction, the adjacent inwardly folded part and at least a part of the corresponding intermediate part of the flexible sunscreen, said guides being provided with locking members and with guide chambers configured to engage the inwardly folded parts of the flexible sunscreen to prevent said inwardly folded parts from moving out of the longitudinal guides when the flexible sunscreen is at least partly unwound,
   wherein each intermediate part includes a first compressed part extending in a longitudinal direction and comprising at least material of the main part, the first compressed part that has undergone compression treatment such that a thickness of the first compressed part of each intermediate part is generally smaller than a thickness of an adjacent portion of the main part, and wherein each intermediate part comprises a second compressed part adjacent to and outwardly of the first compressed part, wherein a thickness of the second compressed part is smaller than a thickness of the first compressed part.

8. The sunshade system according to claim 7, wherein each intermediate part, the corresponding inwardly folded part and the corresponding fold are formed by a lateral edge of the main part.

9. The sunshade system according to claim 7, wherein each folded part, the corresponding fold and a part of the corresponding intermediate part are formed as a strip shaped part separate from the main part.

10. The sunshade system according to claim 7, wherein the first compressed part has a thickness in a range of 0.3 to 1.75 mm.

11. The sunshade system according to claim 7, wherein a lateral width of the first compressed part lies in a range of 4 to 30 mm.

12. A flexible sunscreen configured to open or at least partly close an opening below a vehicle roof assembly, the flexible sunscreen comprising:
   at least a main part and two opposed, laterally placed, inwardly folded parts, a leading edge and a trailing edge; and
   an intermediate part extending in between the main part and each inwardly folded part and extending in a longitudinal direction, whereby each inwardly folded part is connected to the corresponding intermediate part by a fold, wherein each intermediate part includes a first compressed part extending in a longitudinal direction and comprising at least material of the main part that has undergone compression treatment such that said material in the first compressed part has a thickness smaller than the thickness of the same material in the main part, wherein each folded part, the corresponding fold and a part of the corresponding intermediate part are formed as a strip shaped part separate from the main part, and wherein the first compressed part includes a first layer formed by the material of the main part of the sunscreen and a second layer formed by a portion of the strip shaped part.

13. The sunscreen according to claim 12, wherein a thickness of the first compressed part of each intermediate part is generally smaller than a thickness of an adjacent portion of the main part.

14. The sunscreen according to claim 12, wherein the first layer and the second layer overlap each other and wherein at least a substantial part of the first and second layers are compressed from a compression treatment comprising at least one of a pressure and temperature treatment so as to form the first compressed part in which the second layer is fixedly connected to the first layer.

15. The sunscreen according to claim 12, wherein the first compressed part has a thickness in a range of 0.3 to 1.75 mm.

16. The sunscreen according to claim 12, wherein a lateral width of the first compressed part lies in a range of 4 to 30 mm.

* * * * *